United States Patent
Cobb et al.

(10) Patent No.: US 10,796,164 B2
(45) Date of Patent: *Oct. 6, 2020

(54) SCENE PRESET IDENTIFICATION USING QUADTREE DECOMPOSITION ANALYSIS

(71) Applicant: Intellective Ai, Inc., Dallas, TX (US)

(72) Inventors: Wesley Kenneth Cobb, The Woodlands, TX (US); Bobby Ernest Blythe, Pearland, TX (US); Rajkiran Kumar Gottumukkal, Bellevue, WA (US); Kishor Adinath Saitwal, Houston, TX (US); Gang Xu, Katy, TX (US); Tao Yang, Katy, TX (US)

(73) Assignee: Intellective Ai, Inc., Dallas, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/283,387

(22) Filed: Feb. 22, 2019

(65) Prior Publication Data

US 2019/0258867 A1    Aug. 22, 2019

Related U.S. Application Data

(63) Continuation of application No. 15/720,971, filed on Sep. 29, 2017, now Pat. No. 10,248,869, which is a (Continued)

(51) Int. Cl.
*G06K 9/00* (2006.01)
*G06T 7/254* (2017.01)

(52) U.S. Cl.
CPC .......... *G06K 9/00771* (2013.01); *G06T 7/254* (2017.01); *G06T 2207/20081* (2013.01); *G06T 2207/30232* (2013.01)

(58) Field of Classification Search
CPC ...... G06K 9/00771; G06T 2207/20081; G06T 2207/30232; G06T 7/254
See application file for complete search history.

(56) References Cited

U.S. PATENT DOCUMENTS 4,679,077 A    7/1987  Yuasa et al.
5,113,507 A    5/1992  Jaeckel
(Continued)

FOREIGN PATENT DOCUMENTS

EP           1927947         6/2008
WO    WO 2009/049314         4/2009

OTHER PUBLICATIONS

International Search Report and Written Opinion for International Application No. PCT/US2010/045206, dated Apr. 12, 2011, 7 pages.

(Continued)

*Primary Examiner* — Anner N Holder

(57) ABSTRACT

Techniques are disclosed for matching a current background scene of an image received by a surveillance system with a gallery of scene presets that each represent a previously captured background scene. A quadtree decomposition analysis is used to improve the robustness of the matching operation when the scene lighting changes (including portions containing over-saturation/under-saturation) or a portion of the content changes. The current background scene is processed to generate a quadtree decomposition including a plurality of window portions. Each of the window portions is processed to generate a plurality of phase spectra. The phase spectra are then projected onto a corresponding plurality of scene preset image matrices of one or more scene preset. When a match between the current background scene and one of the scene presets is identified, the matched scene preset is updated. Otherwise a new scene preset is created based on the current background scene.

20 Claims, 12 Drawing Sheets

Related U.S. Application Data continuation of application No. 12/543,223, filed on Aug. 18, 2009, now Pat. No. 9,805,271.

(56) References Cited

U.S. PATENT DOCUMENTS

| | | | |
|---|---|---|---|
| 5,748,775 A | 5/1998 | Tsuchikawa et al. | |
| 5,751,378 A | 5/1998 | Chen et al. | |
| 5,969,755 A | 10/1999 | Courtney | |
| 6,078,619 A * | 6/2000 | Monro | H04N 19/503 |
| | | | 375/240 |
| 6,252,974 B1 | 6/2001 | Martens et al. | |
| 6,263,088 B1 | 7/2001 | Crabtree et al. | |
| 6,570,608 B1 | 5/2003 | Tserng | |
| 6,661,918 B1 | 12/2003 | Gordon et al. | |
| 6,674,877 B1 | 1/2004 | Jojic et al. | |
| 6,678,413 B1 | 1/2004 | Liang et al. | |
| 6,856,249 B2 | 2/2005 | Strubbe et al. | |
| 6,940,998 B2 | 9/2005 | Garoutte | |
| 7,076,102 B2 | 7/2006 | Lin et al. | |
| 7,136,525 B1 | 11/2006 | Toyama et al. | |
| 7,158,680 B2 | 1/2007 | Pace | |
| 7,200,266 B2 | 4/2007 | Ozer et al. | |
| 7,227,893 B1 | 6/2007 | Srinivasa et al. | |
| 7,436,887 B2 | 10/2008 | Yeredor et al. | |
| 7,825,954 B2 | 11/2010 | Zhang et al. | |
| 7,868,912 B2 | 1/2011 | Venetianer et al. | |
| 9,805,271 B2 | 10/2017 | Cobb et al. | |
| 10,248,869 B2 | 4/2019 | Cobb et al. | |
| 2003/0063006 A1 * | 4/2003 | Gutta | G01N 21/8803 |
| | | | 340/603 |
| 2003/0107650 A1 | 6/2003 | Colmenarez et al. | |
| 2004/0151342 A1 | 8/2004 | Venetianer et al. | |
| 2004/0239762 A1 * | 12/2004 | Porikli | G06K 9/32 |
| | | | 348/169 |
| 2005/0001759 A1 | 1/2005 | Khosla | |
| 2005/0105765 A1 | 5/2005 | Han et al. | |
| 2005/0240629 A1 | 10/2005 | Gu et al. | |
| 2006/0018516 A1 | 1/2006 | Masoud et al. | |
| 2006/0034519 A1 * | 2/2006 | Toyama | G06K 9/38 |
| | | | 382/224 |
| 2006/0165386 A1 | 7/2006 | Garoutte | |
| 2006/0190419 A1 | 8/2006 | Bunn et al. | |
| 2006/0222206 A1 | 10/2006 | Garoutte | |
| 2007/0279494 A1 * | 12/2007 | Aman | G01S 3/7864 |
| | | | 348/169 |
| 2008/0002856 A1 | 1/2008 | Ma et al. | |
| 2008/0181453 A1 | 7/2008 | Xu et al. | |
| 2008/0181499 A1 | 7/2008 | Yang et al. | |
| 2008/0193010 A1 | 8/2008 | Eaton et al. | |
| 2008/0240496 A1 | 10/2008 | Senior | |
| 2008/0252723 A1 | 10/2008 | Park | |
| 2009/0022364 A1 | 1/2009 | Swaminathan et al. | |
| 2009/0067716 A1 | 3/2009 | Brown et al. | |
| 2009/0210367 A1 | 8/2009 | Armstrong et al. | |
| 2009/0297023 A1 | 12/2009 | Lipton et al. | |
| 2009/0324107 A1 | 12/2009 | Walch | |
| 2010/0063949 A1 | 3/2010 | Eaton et al. | |
| 2011/0043625 A1 | 2/2011 | Cobb et al. | |
| 2018/0247133 A1 | 8/2018 | Cobb et al. | |

OTHER PUBLICATIONS

Apewokin et al. "Multimodal Mean Adaptive Backgrounding for Embedded Real-Time Video Surveillance," Jun. 2007, IEEE 6 pages, Minneapolis, MN.

Connell, J. et al., "Detection and Tracking in the IBM PeopleVision System," IEEE ICME, Jun. 2004, pp. 1-4.

Elgammal et al. "Non-parametric Model for Background Subtraction," Computer Vision Laboratory, University of Maryland; Jun. 2000; 17 pages, College Park, MD.

Grabner, H. et al., "On-line Boosting and Vision," IEEE Conference on Computer Vision and Pattern Recognition (CVPR), 2006, vol. 1, pp. 260-267.

Haritaoglu, I. et al., "Ghost: A Human Body Part Labeling System Using Silhouettes," 14th Annual International Conference on Pattern Recognition, dated Aug. 16-20, 1998, Brisbane, Australia, 6 pages.

Haritaoglu, I. et al., "W4: Real-time surveillance of people and their activities," IEEE Transactions on Pattern Analysis and Machine Intelligence, 22(8):809-830 (Aug. 2000).

Ivanov et al. "Video Surveillance of Interactions," MIT Media Laboratory, Cambridge, MA, Jul. 1999, 8 pages, Fort Collins, CO.

Kanerva, P., "Sparse Distributed memory and Related Models," M.H. Hassoun, ed., Associative Neural Memories: Theory and Implementation, 1993, pp. 50-76, New York: Oxford University Press.

Nock, R. et al., "Statistical Region Merging," IEEE Transactions on Pattern Analysis and Machine Intelligence, Nov. 2004, 26(11):1452-1458.

Senior et al. "Appearance Models for Occlusion Handling," IBM T.J. Watson Research Center, 2001, 8 pages, Yorktown Heights, NY.

Stauffer, C. et al., "Adaptive background mixture models for real-time tracking," Proceedings IEEE Conference on Computer Vision and Pattern Recognition, 1999: pp. 246-252.

Stauffer, C. et al., "Learning Patterns of Activity Using Real-Time Tracking," IEEE Transactions on Pattern Analysis and Machine Intelligence (TPAMI), Aug. 2000, 22(8): 747-757.

* cited by examiner

SCENE PRESET IDENTIFICATION USING QUADTREE DECOMPOSITION ANALYSIS

This application is a continuation of U.S. patent application Ser. No. 15/720,971 filed Sep. 29, 2017 and titled "SCENE PRESET IDENTIFICATION USING QUADTREE DECOMPOSITION ANALYSIS," which is a continuation of U.S. patent application Ser. No. 12/543,223, filed Aug. 18, 2009; the entireties of the aforementioned applications are herein incorporated by reference.

FIELD

Embodiments of the disclosure provide techniques for matching a background scene of an image captured by a surveillance system with a gallery of background scenes. More specifically, embodiments of the disclosure relate to techniques for using quadtree decomposition analysis to perform background scene matching.

DESCRIPTION OF THE RELATED ART

Some currently available video surveillance systems provide simple object recognition capabilities. For example, a video surveillance system may be configured to classify a group of pixels (referred to as a "blob") in a given frame as being a particular object (e.g., a person or vehicle). Once identified, a "blob" may be tracked frame-to-frame in order to follow the "blob" moving through the scene over time, e.g., a person walking across the field of vision of a video surveillance camera. Further, such systems may be configured to determine when an object has engaged in certain predefined behaviors.

However, such surveillance systems typically require that the objects and/or behaviors which may be recognized by the system to be defined in advance. Thus, in practice, these systems rely on predefined definitions for objects and/or behaviors to evaluate a video sequence. In other words, unless the underlying system includes a description for a particular object or behavior, the system is generally incapable of recognizing that behavior (or at least instances of the pattern describing the particular object or behavior). Thus, what is "normal" or "abnormal" behavior needs to be defined in advance, and separate software products need to be developed to recognize additional objects or behaviors. This results in surveillance systems with recognition capabilities that are labor intensive and prohibitively costly to maintain or adapt for different specialized applications. Accordingly, currently available video surveillance systems are typically unable to recognize new patterns of behavior that may emerge in a given scene or recognize changes in existing patterns. More generally, such systems are often unable to identify objects, events, behaviors, or patterns as being "normal" or "abnormal" by observing what happens in the scene over time; instead, such systems rely on static patterns defined in advance.

SUMMARY

One embodiment of the disclosure includes a computer-implemented method for identifying a scene preset for a background scene of an image. The method may generally include receiving the background scene and generating a quadtree decomposition of the background scene. The quadtree decomposition includes a plurality of window portions of the background scene. The method determines if the background scene matches a stored scene preset representing a previously captured background scene, based on the plurality of window portions of the background scene. The scene preset is updated when the background scene matches the stored background scene. A new scene preset is created when the background scene does not match any of the stored background scenes.

Another embodiment of the disclosure includes a computer-readable storage medium containing a program which, when executed by a processor, performs an operation for identifying a scene preset for a background scene of an image. The operation may generally include receiving the background scene and generating a quadtree decomposition of the background scene. The quadtree decomposition includes a plurality of window portions of the background scene. The method determines if the background scene matches a stored scene preset representing a previously captured background scene, based on the plurality of window portions of the background scene. The scene preset is updated when the background scene matches the stored background scene. A new scene preset is created when the background scene does not match any of the stored background scenes.

Still another embodiment includes a system having a video input source configured to capture images, a processor, and a memory. The memory contains a program, which, when executed on the processor is configured to perform an operation for identifying a scene preset for a background scene of an image captured by the video input source. The operation comprises receiving the background scene, generating a quadtree decomposition of the background scene, the quadtree decomposition including a plurality of window portions of the background scene, determining if the background scene matches a stored scene preset representing a previously captured background scene, based on the plurality of window portions of the background scene. The scene preset is updated when the background scene matches the stored background scene. A new scene preset is created when the background scene does not match any of the stored background scenes.

BRIEF DESCRIPTION OF THE DRAWINGS

So that the manner in which the above recited features, advantages, and objects of the present disclosure are attained and can be understood in detail, a more particular description of the some embodiments of the disclosure, briefly summarized above, may be had by reference to the embodiments illustrated in the appended drawings.

It is to be noted, however, that the appended drawings illustrate only typical embodiments of this disclosure and are therefore not to be considered limiting of its scope, for the disclosure may admit to other equally effective embodiments.

DETAILED DESCRIPTION

Figure 1:
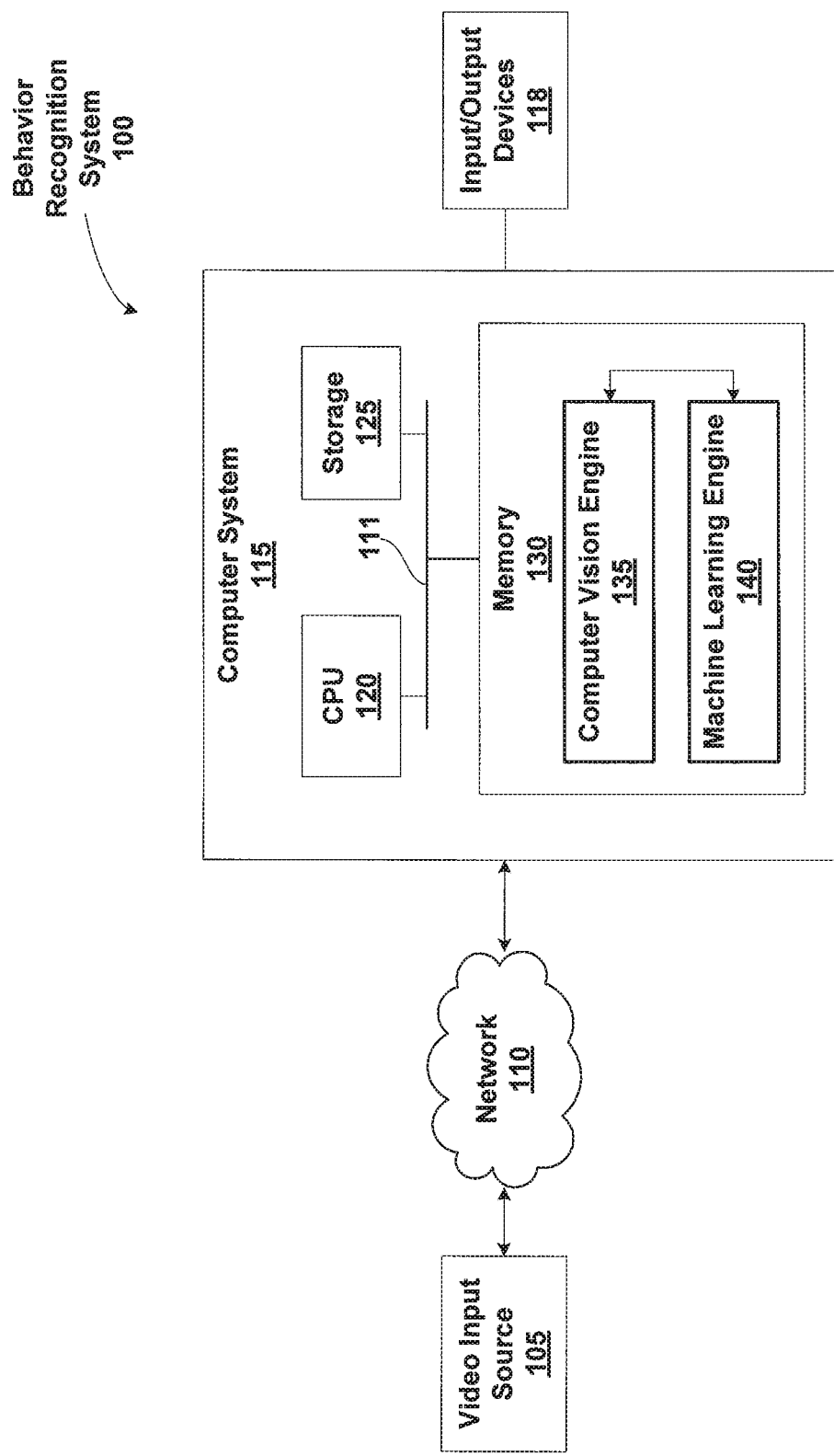
FIG. 1 illustrates components of a video analysis and behavior-recognition system, according to one embodiment of the disclosure.

Embodiments of the disclosure provide a behavior-recognition system which can identify, learn, and recognize patterns of behavior by observing and evaluating events depicted by a sequence of video frames. In a particular embodiment, the behavior-recognition system can include both a computer vision engine and a machine-learning engine. The computer vision engine can be configured to receive and evaluate a stream of video frames. Each frame can include data representing the color, grayscale, and/or intensity values for each pixel in the frame. A frame of video can be characterized using multiple color channels (e.g., a radiance value between 0-255 and a set of red, green, and blue (RGB) color channels values, each between 0-255). Further, the computer vision engine can generate a background scene by observing the scene over a number of video frames. For example, consider a video camera trained on a stretch of a highway. In such a case, the background scene would include the roadway surface, the medians, any guard rails or other safety devices, and traffic control devices, etc., that are visible to the camera. Vehicles traveling on the roadway (and any other person or thing engaging in some activity) that are visible to the camera would represent scene foreground objects.

The computer vision engine can compare the pixel values for a given frame with the background scene and identify objects as they appear and move about the scene. Typically, when a region of the scene (referred to as a "blob" or "patch") is observed with appearance values that differ substantially from the background scene, that region is identified as depicting a foreground object. Once identified, the object can be evaluated by a classifier configured to determine what is depicted by the foreground object (e.g., a vehicle or a person). Further, the computer vision engine can identify features (e.g., height/width in pixels, average color values, shape, area, and the like) used to track the object from frame-to-frame. Further still, the computer vision engine can derive a variety of information while tracking the object from frame-to-frame, e.g., position, current (and projected) trajectory, direction, orientation, velocity, acceleration, size, color, and the like. In one embodiment, the computer vision outputs this information as a stream of "context events" describing a collection of kinematic information related to each foreground object detected in the video frames.

Data output from the computer vision engine can be supplied to the machine-learning engine. In one embodiment, the machine-learning engine can evaluate the context events to generate "primitive events" describing object behavior. Each primitive event can provide some semantic meaning to a group of one or more context events. For example, assume a camera records a car entering a scene, and that the car turns and parks in a parking spot. In such a case, the computer vision engine could initially recognize the car as a foreground object; classify it as being a vehicle, and output kinematic data describing the position, movement, speed, etc., of the car in the context event stream. In turn, a primitive event detector could generate a stream of primitive events from the context event stream such as "vehicle appears," vehicle turns," "vehicle slowing," and "vehicle stops" (once the kinematic information about the car indicated a speed of 0). As events occur, and re-occur, the machine-learning engine can create, encode, store, retrieve, and reinforce patterns representing the events observed to have occurred, e.g., long-term memories representing a higher-level abstraction of a car parking in the scene—generated from the primitive events underlying the higher-level abstraction. Further still, patterns representing an event of interest can result in alerts passed to users of the behavioral recognition system.

In order for the system to recognize objects and/or behavior a background scene is separated from the foreground objects in the scene. In one embodiment, different background scenes can be observed by the system during surveillance. Further, system can retrain a background model (and a collection of learned observations) for multiple, distinct scenes (e.g., one scene for different camera positions). In such a case, the system can search a database of scene presets to match a current background scene to one of the saved presets. However, changes in lighting and scene-content may interfere with the system's ability to accurately match the current background scene to a scene preset. Accordingly, embodiments of the disclosure provide techniques for matching the current background scene to a scene preset that is robust to changes in scene lighting or minor content changes. Thus, a camera may observe a scene for some period of time (generating a background model and observations used to characterize events observed to occur as being "normal" or "abnormal"). And if the camera is then interrupted or moved, when the camera is again trained on the same scene, the system can continue observing the scene without having to effectively start over.

One embodiment of the disclosure is implemented as a program product for use with a computer system. The program(s) of the program product defines functions of the embodiments (including the methods described herein) and can be contained on a variety of computer-readable storage media. Examples of computer-readable storage media include (i) non-writable storage media (e.g., read-only memory devices within a computer such as CD-ROM or DVD-ROM disks readable by an optical media drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present disclosure, are embodiments of the present disclosure. Other examples media include communications media through which information is conveyed to a computer, such as through a computer or telephone network, including wireless communications networks.

In general, the routines executed to implement the embodiments of the disclosure can be part of an operating system or a specific application, component, program, module, object, or sequence of instructions. The computer program of the present disclosure is comprised typically of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the disclosure. However, it should be appreciated that any particular program nomenclature that follows is used merely for convenience, and thus the disclosure should not be limited to use solely in any specific application identified and/or implied by such nomenclature.

FIG. 1 illustrates components of a video analysis and behavior-recognition system 100, according to one embodiment of the present disclosure. As shown, the behavior-recognition system 100 includes a video input source 105, a network 110, a computer system 115, and input and output devices 118 (e.g., a monitor, a keyboard, a mouse, a printer, and the like). The network 110 can transmit video data recorded by the video input 105 to the computer system 115. Illustratively, the computer system 115 includes a CPU 120, storage 125 (e.g., a disk drive, optical disk drive, floppy disk drive, and the like), and a memory 130 containing both a computer vision engine 135 and a machine-learning engine 140. As described in greater detail below, the computer vision engine 135 and the machine-learning engine 140 can provide software applications configured to analyze a sequence of video frames provided by the video input 105.

Network 110 receives video data (e.g., video stream(s), video images, or the like) from the video input source 105. The video input source 105 can be a video camera, a VCR, DVR, DVD, computer, web-cam device, or the like. For example, the video input source 105 can be a stationary video camera aimed at a certain area (e.g., a subway station, a parking lot, a building entry/exit, etc.), which captures the events taking place therein. Generally, the area visible to the camera is referred to as the "scene." The video input source 105 can be configured to capture the scene as a sequence of individual video frames at a specified frame-rate (e.g., 24 frames per second), where each frame includes a fixed number of pixels (e.g., 320×240). Each pixel of each frame can specify a color value (e.g., an RGB value) or grayscale value (e.g., a radiance value between 0-255). Further, the video stream may be formatted using known such formats e.g., MPEG2, MJPEG, MPEG4, H.263, H.264, and the like.

The computer vision engine 135 can be configured to analyze this raw information to identify active objects in the video stream, classify the objects, derive a variety of metadata regarding the actions and interactions of such objects, and supply this information to a machine-learning engine 140. In turn, the machine-learning engine 140 can be configured to evaluate, observe, learn and remember details regarding events (and types of events) that transpire within the scene over time.

In one embodiment, the machine-learning engine 140 receives the video frames and the data generated by the computer vision engine 135. The machine-learning engine 140 can be configured to analyze the received data, build semantic representations of events depicted in the video frames, detect patterns, and, ultimately, to learn from these observed patterns to identify normal and/or abnormal events. Additionally, data describing whether a normal/abnormal behavior/event has been determined and/or what such behavior/event is can be provided to output devices 118 to issue alerts, for example, an alert message presented on a GUI interface screen. In general, the computer vision engine 135 and the machine-learning engine 140 both process video data in real-time. However, time scales for processing information by the computer vision engine 135 and the machine-learning engine 140 may differ. For example, in one embodiment, the computer vision engine 135 processes the received video data frame-by-frame, while the machine-learning engine 140 processes data every N-frames. In other words, while the computer vision engine 135 analyzes each frame in real-time to derive a set of information about what is occurring within a given frame, the machine-learning engine 140 is not constrained by the real-time frame rate of the video input.

Note, however, FIG. 1 illustrates merely one possible arrangement of the behavior-recognition system 100. For example, although the video input source 105 is shown connected to the computer system 115 via the network 110, the network 110 is not always present or needed (e.g., the video input source 105 may be directly connected to the computer system 115). Further, various components and modules of the behavior-recognition system 100 may be implemented in other systems. For example, in one embodiment, the computer vision engine 135 may be implemented as a part of a video input device (e.g., as a firmware component wired directly into a video camera). In such a case, the output of the video camera may be provided to the machine-learning engine 140 for analysis. Similarly, the output from the computer vision engine 135 and machine-learning engine 140 may be supplied over computer network 110 to other computer systems. For example, the computer vision engine 135 and machine-learning engine 140 may be installed on a server system and configured to process video from multiple input sources (i.e., from multiple cameras). In such a case, a client application 250 running on another computer system may request (or receive) the results over network 110.

Figure 2:
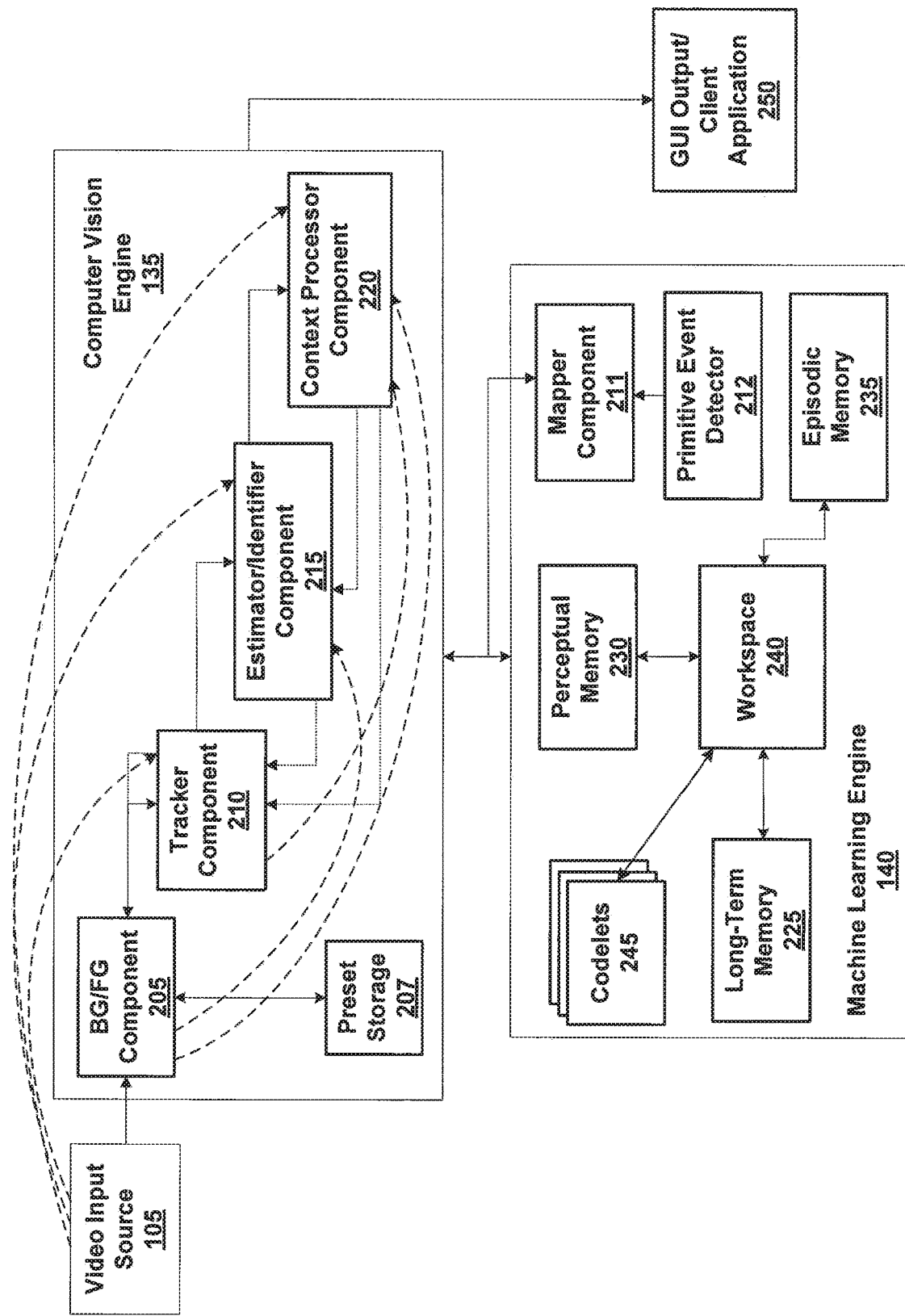
FIG. 2 illustrates components of a computer vision engine and of a machine-learning engine, according to one embodiment of the present disclosure.

FIG. 2 further illustrates components of the computer vision engine 135 and the machine-learning engine 140 first illustrated in FIG. 1, according to one embodiment of the present disclosure. As shown, the computer vision engine 135 includes a background/foreground (BG/FG) component 205 and associated preset storage 207, a tracker component 210, an estimator/identifier component 215, and a context processor component 220. Collectively, the components 205, 210, 215, and 220 provide a pipeline for processing an incoming sequence of video frames supplied by the video input source 105 (indicated by the solid arrows linking the components). Additionally, the output of one component may be provided to multiple stages of the component pipeline (as indicated by the dashed arrows). In one embodiment, the components 205, 210, 215, and 220 may each provide a software module configured to provide the functions described herein. Of course one of ordinary skill in the art will recognize that the components 205, 210, 215, and 220 may be combined (or further subdivided) to suit the needs of a particular case.

In one embodiment, the BG/FG component 205 may be configured to separate each frame of video provided by the video input source 105 into a stationary or static part (the background scene) and a collection of volatile parts (the foreground scene). The frame itself may include a two-dimensional array of pixel values for multiple channels (e.g., RGB channels for color video or grayscale channel or radiance channel for black and white video). The BG/FG component 205 may be configured to generate a mask used to identify which pixels of the scene have been determined to depict the foreground and, conversely, which pixels have been determined to depict the background. The BG/FG component 205 then identifies regions of the scene that contain the foreground scene(referred to as a foreground "blob" or "patch") and supplies this information to subsequent stages of the pipeline.

Present storage 207 may store a gallery of scene presets, each representing a previously captured background image for a scene. Each scene preset may correspond to a location and orientation of a video camera. In one embodiment, each time the camera observes a scene, a background of the scene is compared with the gallery of scene presets to identify a scene preset that matches the current background scene (or create a new scene preset if no match is identified). When a camera position changes, a scene preset corresponding to the new position is identified and any learning that was previously generated by the machine-learning engine 140 may be restored. This ability to continue the learning process for a camera position, rather than start over each time the camera position changes improves the ability of the system to quickly classify objects and behaviors and learn from previously observed patterns to identify normal and/or abnormal events.

The tracker component 210 may receive the foreground patches produced by the BG/FG component 205 and generate computational models for the patches. The tracker component 210 may be configured to use this information, and each successive frame of raw-video, to attempt to track the motion of the objects depicted by the foreground patches as they move about the scene.

The estimator/identifier component 215 may receive the output of the tracker component 210 (and the BF/FG component 205) and classify each tracked object as being one of a known category of objects. For example, in one embodiment, estimator/identifier component 215 may classify a tracked object as being a "person," a "vehicle," an "unknown," or an "other." In this context, the classification of "other" represents an affirmative assertion that the object is neither a "person" nor a "vehicle." Additionally, the estimator/identifier component may identify characteristics of the tracked object, e.g., for a person, a prediction of gender, an estimation of a pose (e.g., standing or sitting) or an indication of whether the person is carrying an object.

The context processor component 220 may receive the output from other stages of the pipeline (i.e., the tracked objects, the background scene and foreground patches, and the results of the estimator/identifier component 215). Using this information, the context processor 220 may be configured to generate a stream of context events regarding objects tracked (by tracker component 210) and classified (by estimator identifier component 215). For example, the context processor component 220 may evaluate a foreground object from frame-to-frame and output context events describing that object's height, width (in pixels), position (as a 2D coordinate in the scene), acceleration, velocity, orientation angle, etc.

The computer vision engine 135 may take the outputs of the components 205, 210, 215, and 220 describing the motions and actions of the tracked objects in the scene and supply this information to the machine-learning engine 140.

In one embodiment, the primitive event detector 212 may be configured to receive the output of the computer vision engine 135 (i.e., the video images, the object classifications, and context event stream) and generate a sequence of primitive events—labeling the observed actions or behaviors in the video with semantic meaning. For example, assume the computer vision engine 135 has identified a foreground object and classified that foreground object as being a vehicle and the context processor component 220 estimates the kinematic data regarding the car's position and velocity. In such a case, this information is supplied to the machine-learning engine 140 and the primitive event detector 212. In turn, the primitive event detector 212 may generate a semantic symbol stream providing a simple linguistic description of actions engaged in by the vehicle. For example, a sequence of primitive events related to observations of the computer vision engine 135 occurring at a parking lot could include formal language vectors representing the following: "vehicle appears in scene," "vehicle moves to a given location," "vehicle stops moving," "person appears proximate to vehicle," "person moves," person leaves scene" "person appears in scene," "person moves proximate to vehicle," "person disappears," "vehicle starts moving," and "vehicle disappears." As described in greater detail below, the primitive event stream may be supplied to excite the perceptual associative memory 230.

Illustratively, the machine-learning engine 140 includes a long-term memory 225, a perceptual memory 230, an episodic memory 235, a workspace 240, codelets 245, and a mapper component 211. In one embodiment, the perceptual memory 230, the episodic memory 235, and the long-term memory 225 are used to identify patterns of behavior, evaluate events that transpire in the scene, and encode and store observations. Generally, the perceptual memory 230 receives the output of the computer vision engine 135 (e.g., the context event stream) and a primitive event stream generated by primitive event detector 212. The episodic memory 235 stores data representing observed events with details related to a particular episode, e.g., information describing time and space details related on an event. That is, the episodic memory 235 may encode specific details of a particular event, i.e., "what and where" something occurred within a scene, such as a particular vehicle (car A) moved to a location believed to be a parking space (parking space 5) at 9:43 AM.

The long-term memory 225 may store data generalizing events observed in the scene. To continue with the example of a vehicle parking, the long-term memory 225 may encode information capturing observations and generalizations learned by an analysis of the behavior of objects in the scene such as "vehicles tend to park in a particular place in the scene," "when parking vehicles tend to move a certain speed," and "after a vehicle parks, people tend to appear in the scene proximate to the vehicle," etc. Thus, the long-term memory 225 stores observations about what happens within a scene with much of the particular episodic details stripped away. In this way, when a new event occurs, memories from the episodic memory 235 and the long-term memory 225 may be used to relate and understand a current event, i.e., the new event may be compared with past experience, leading to both reinforcement, decay, and adjustments to the information stored in the long-term memory 225, over time. In a particular embodiment, the long-term memory 225 may be implemented as an ART network and a sparse-distributed memory data structure.

The mapper component 211 may receive the context event stream and the primitive event stream and parse information to multiple ART networks to generate statistical models of what occurs in the scene for different groups of context events and primitive events.

Generally, the workspace 240 provides a computational engine for the machine-learning engine 140. For example, the workspace 240 may be configured to copy information from the perceptual memory 230, retrieve relevant memories from the episodic memory 235 and the long-term memory 225, select and invoke the execution of one of codelets 245. In one embodiment, each codelet 245 is a software program configured to evaluate different sequences of events and to determine how one sequence may follow (or otherwise relate to) another (e.g., a finite state machine). More generally, the codelet may provide a software module configured to detect interesting patterns from the streams of data fed to the machine-learning engine 140. In turn, the codelet 245 may create, retrieve, reinforce, or modify memories in the episodic memory 235 and the long-term memory 225. By repeatedly scheduling codelets 245 for execution, copying memories and percepts to/from the workspace 240, the machine-learning engine 140 performs a cognitive cycle used to observe, and learn, about patterns of behavior that occur within the scene. Whenever a scene preset is restored, the cognitive cycle associated with the background scene represented by the scene preset may be restored, improving the performance of the machine-learning engine 140.

Figure 3A:
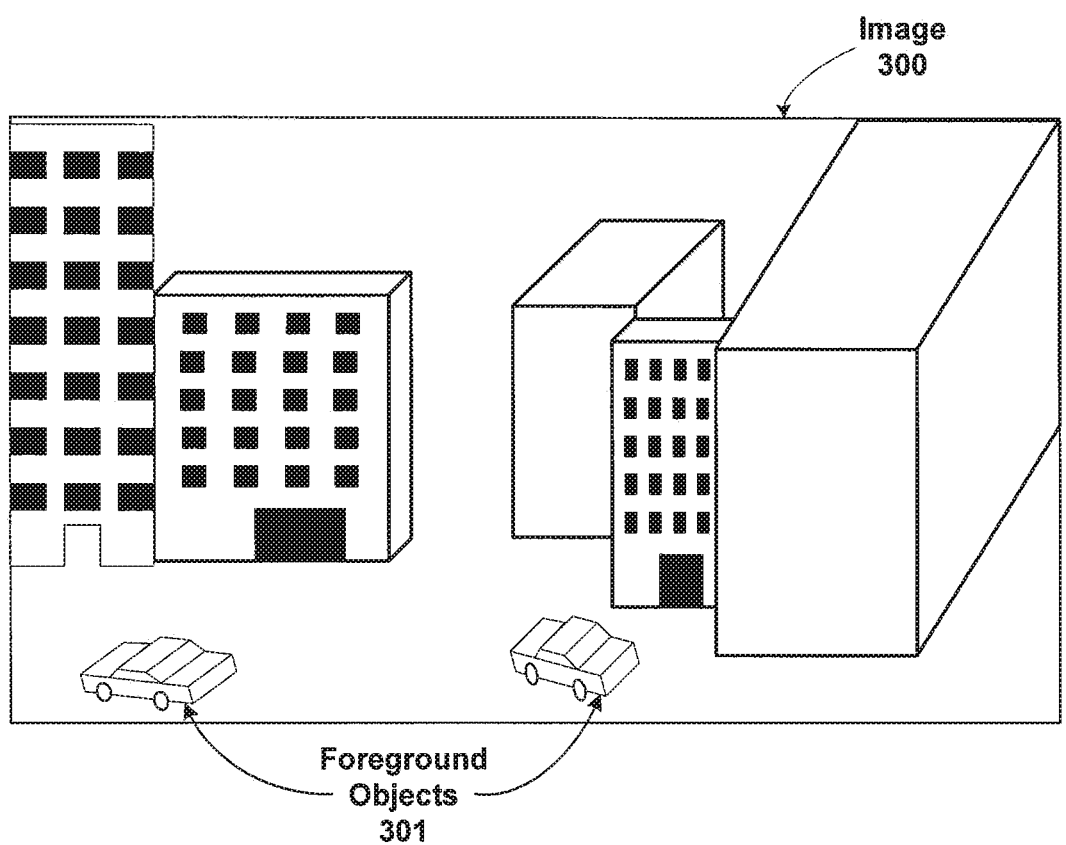
FIG. 3A illustrates an image captured by a camera, according to one embodiment of the disclosure.
Figure 3B:
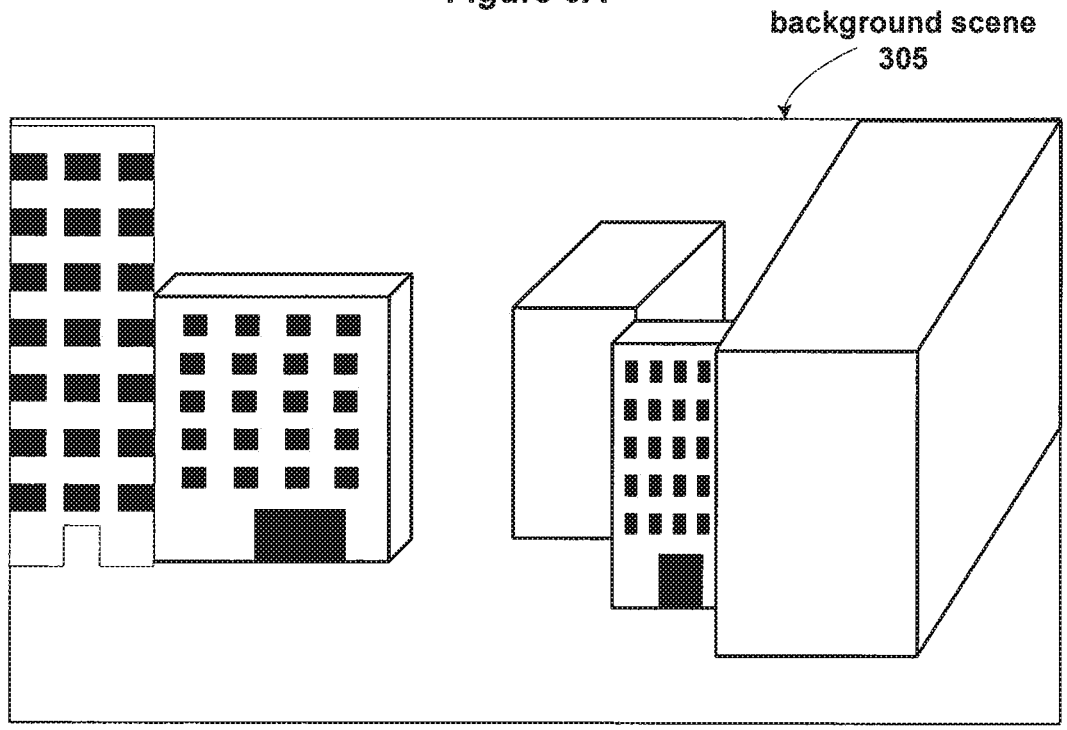
FIG. 3B illustrates the background scene of the image shown in FIG. 3A, according to one embodiment of the disclosure.
Figure 3C:
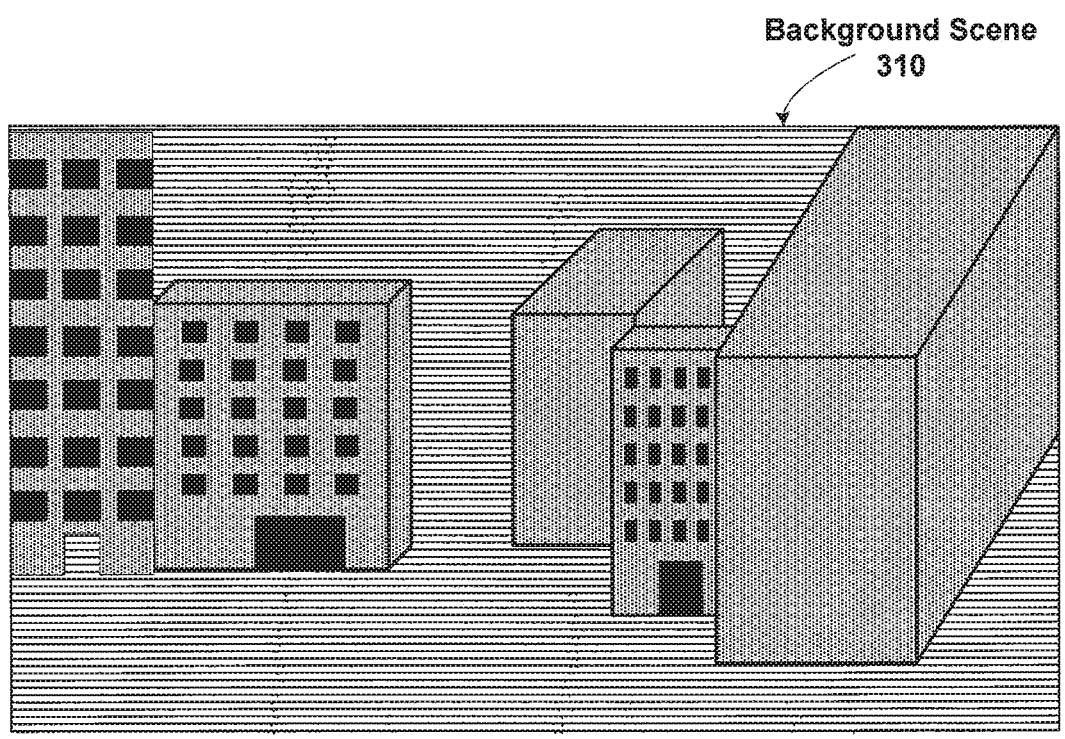
FIG. 3C illustrates the background scene shown in FIG. 3B under different lighting conditions, according to one embodiment of the disclosure.

FIG. 3A illustrates an image 300 captured by a camera, according to one embodiment of the disclosure. The image 300 includes foreground objects 301 that are identified as a foreground patch by the BG/FG component 205. The BG/FG component 205 also identifies the background scene. FIG. 3B illustrates the background scene 305 of the image 300 shown in FIG. 3A, according to one embodiment of the disclosure. FIG. 3C illustrates the background scene 310 that is the background scene 305 under different lighting conditions, according to one embodiment of the disclosure. In some cases it may be desirable to match the same scene preset to the background scene 310 and the background scene 305 in order to use the learning developed for background scene 305 when background scene 310 is being observed. In other cases, it may be desirable to have separate scene presets for the background scene 310 and the background scene 305 since different behaviors occur during different times of the day.

Figure 3D:
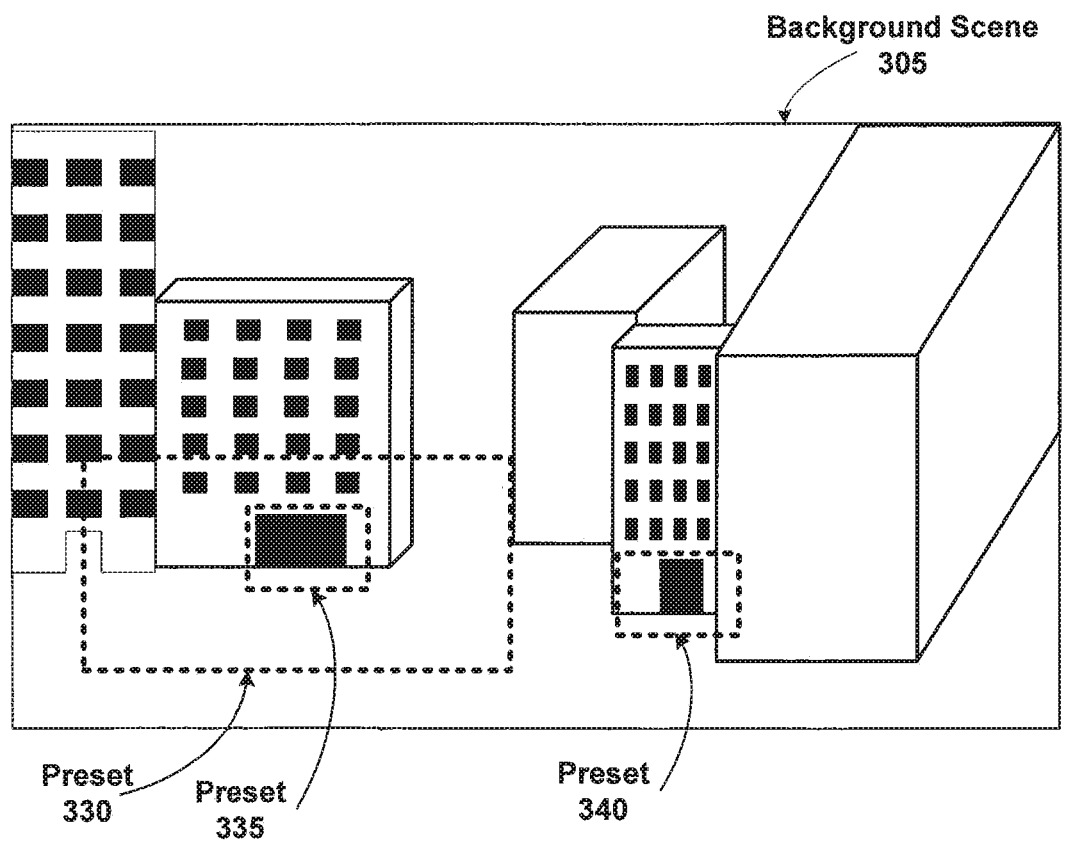
FIG. 3D illustrates preset images positioned in the background scene shown in FIG. 3B, according to one embodiment of the disclosure.

FIG. 3D illustrates scene presets 330, 335, and 340 that are positioned in the background scene 305, according to one embodiment of the disclosure. Scene preset 335 is included within scene preset 330 and a background scene for a camera that is zoomed into capture scene preset 335 should not be matched to the scene preset for 330. Similarly, a background scene for a camera that captures the image corresponding to scene preset 335 should not be matched to the scene preset for 340. Furthermore, when few objects (not a foreground object) obscure a portion(s) of a background scene, it may be desirable to match the background scene to the scene preset of the background scene without those objects. A matching technique that is robust in terms of changes in illumination and small changes in the background content allows the system to restore learning associated with a stored scene preset and to continue learning; rather than to begin learning by creating a new scene preset.

Figure 4A:
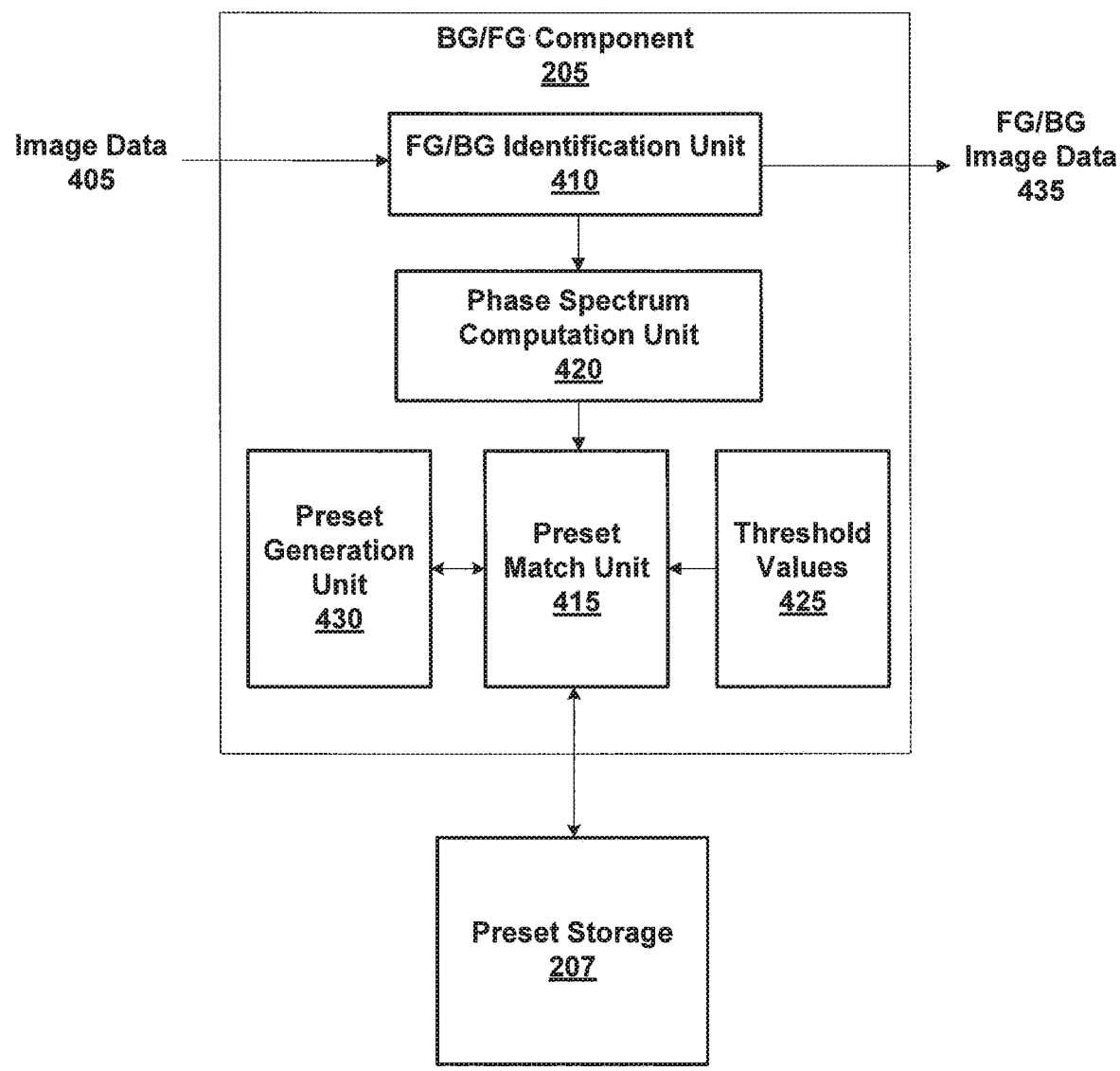
FIG. 4A illustrates components of the BG/FG component shown in FIG. 2, according to one embodiment of the present disclosure.

FIG. 4A illustrates units of the BG/FG component 205 shown in FIG. 2, according to one embodiment of the present disclosure. The BG/FG component 205 is coupled to the preset storage 207 and includes a FG/BG identification unit 410, a phase spectrum computation unit 420, a preset generation unit 430, a preset match unit 415, and threshold values 425. The FG/BG identification unit 410 extracts the foreground patch and the background scene from the image data 405 and outputs the foreground patch and the background scene as the FG/BG image data 435. The FG/BG image data 435 may also include a scene preset identifier used by the machine-learning engine 140 to restore learning data for the scene preset. In one embodiment, the phase spectrum computation unit 420 receives and processes the background scene using a fast Fourier transform algorithm to generate a phase spectrum for the background scene.

The phase spectrum for the background scene is output to the preset match unit 415. When a background scene is captured for the first time (or when no scene presets are stored in the preset storage 207), a new scene preset is generated using the background scene. The preset match unit 415 outputs the background scene and a number of additional background scenes in a sequence that includes the background scene to the preset generation unit 430. The phase spectrum computation unit 420 generates phase spectra of the additional background scenes that are also output by preset match unit 415 to the preset generation unit 430. In one embodiment, the Preset generation unit 430 performs a principal components analysis (PCA) to produce an eigenphase decomposition (or eigenspace in frequency phase spectrum domain) for the background scene and the additional background scenes. The eigenphase decomposition is encoded as image matrices with the first matrix encoding the average of the background scene and the additional background scenes and the subsequent matrices encoding different characteristics of the background scene and the additional background scenes in descending order of significance. The image matrices for the scene preset that represents the background scene and the additional background scenes are stored in the preset storage 207. In other embodiments, a linear discriminant analysis (or other factor analysis technique) may be used to generate image matrices for matching operations.

When a background scene is received by the preset match unit 415, the preset match unit 415 determines whether one of the scene presets stored in the preset storage 207 matches the background scene. The preset match unit 415 projects the phase spectrum of the background scene onto each of the scene presets that is stored in the preset storage 207. In some embodiments, the preset match unit 415 performs the projection in parallel for all of the scene presets and in other embodiments the preset match unit 415 performs the projections serially. Based on the projection operations, the preset match unit 415 computes a reconstruction error (or a reconstruction score) for each scene preset. If the reconstruction error for one of the scene presets is less than or equal to a threshold error value then the preset match unit 415 determines that one of the scene presets does represent the background scene, i.e., the scene preset matches the background scene. If more than one reconstruction errors are less than or equal to the threshold error, the preset corresponding to the minimum reconstruction error is selected. One or more threshold error values are stored in the threshold values 425. In some embodiments different threshold error values may be used for different cameras.

The scene preset is updated to incorporate the matched background scene. The incorporation may be accomplished by replacing the phase spectrum of the oldest background scene that was used to compute the scene preset with the phase spectrum of the matched background scene and recomputes the image matrices to produce an updated scene preset. In some embodiments the updating is performed periodically, e.g., every N minutes or images, when at least one matched background scene needs to be incorporated to update a scene preset. Consequently, over time a scene preset may evolve to reflect gradual changes of a background scene without requiring creation of a new scene preset. The phase spectra of the background scene that were used to compute each scene preset may be stored in the preset storage 207. The phase spectra of any matched background scenes that have not yet been incorporated into a scene preset may also be stored in the preset storage 207.

Figure 4B:
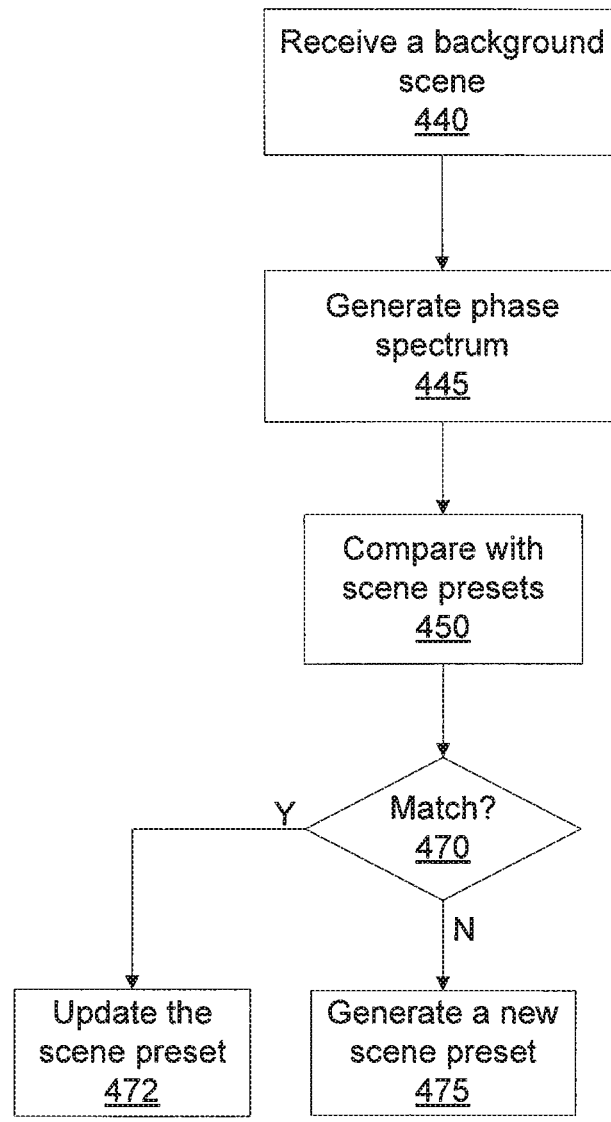
FIG. 4B illustrates a method for identifying a scene preset, according to one embodiment of the disclosure.

FIG. 4B illustrates a method for identifying a scene preset that matches a background scene, according to one embodiment of the disclosure. As shown, the method begins at step 440 where a background image of a scene is identified by FG/BG identification unit 410. At step 445, the phase spectrum computation unit 420 generates the phase spectrum for the background image derived by the FG/BG identification unit 410. At step 450, the preset match unit 415 compares the background scene with any scene presets that are stored in the preset storage 207 to determine whether the background scene matches a scene preset. Step 450 is described in detail in conjunction with FIG. 4C.

At step 470 the preset match unit 415 determines if a scene preset matches the background scene, and, if so, at step 472 the scene preset is updated to incorporate the background scene. Otherwise, at step 475 a new scene preset is generated for the background scene received at step 440, as described in conjunction with FIG. 4D.

Figure 4C:
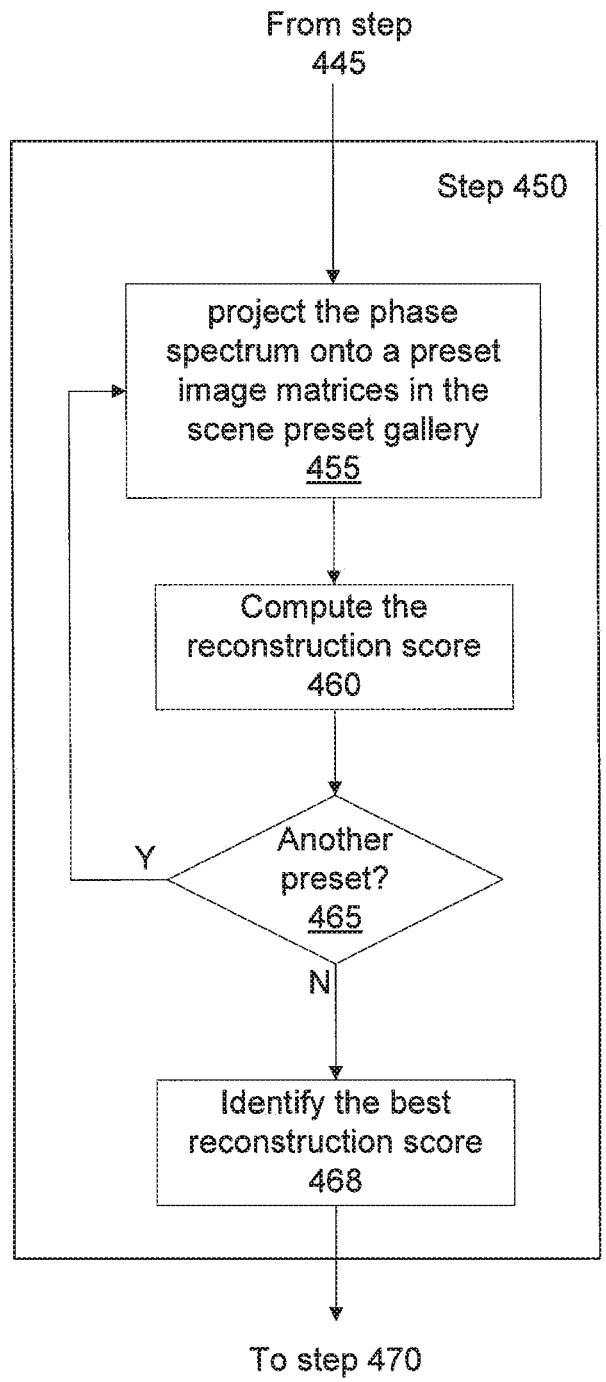
FIG. 4C illustrates a method for comparing a current background scene with scene presets, according to one embodiment of the disclosure.

FIG. 4C illustrates a method for comparing a background scene with scene presets, according to one embodiment of the disclosure. The method begins at step 455 where the phase spectrum of the background scene (i.e., the background image of a scene derived by the FG/BF identification unit 410) is projected onto the image matrices for a first scene preset. The first scene preset may be obtained from the scene preset gallery maintained by the preset storage 207. At step 460 a reconstruction score (or reconstruction error) is computed for the background scene based on the projection. In some embodiments a reconstruction score of 1.0 (or reconstruction error of 0) indicates there is a 100% match between the background scene and the scene preset. A minimum error threshold value may be specified so that a lower reconstruction score (or non-zero reconstruction error) also indicates that there is a match between the background scene and the scene preset.

At step 465 the preset match unit 415 determines if another scene preset is available for comparison with the background scene, i.e., is stored in the preset storage 207. When another scene preset is available, steps 455, 460 and 465 are repeated. Otherwise, at step 468 the preset match unit 415 identifies the best reconstruction score resulting from the comparisons between the background scene and the scene presets. The best reconstruction score is used in step 470 to determine whether one of any scene preset matches the background scene. In some embodiments, the preset match unit 415 is configured to skip steps 450 when no scene presets are stored in preset storage 207. In other embodiments, the scene presets are initialized to predetermined values.

Figure 4D:
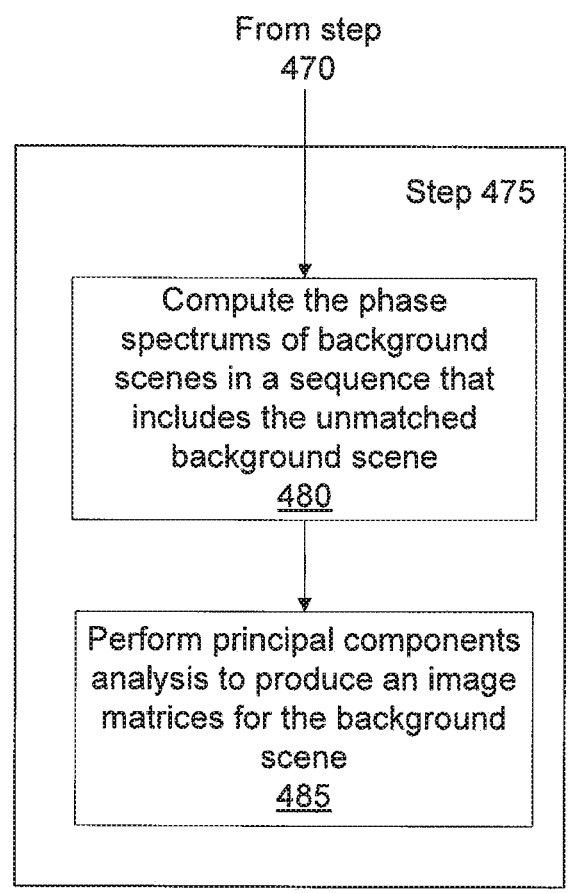
FIG. 4D illustrates a method for generating a new scene preset, according to one embodiment of the disclosure.

FIG. 4D illustrates a method for creating a new scene preset, according to one embodiment of the disclosure. At step 480, the phase spectra of background scenes in a sequence of background scenes that includes the unmatched background scene are computed. At step 485, a PCA may be performed to produce image matrices for the background scene. The image matrices represent the unmatched background scene and the additional background scenes in the sequence. Notice that PCA provides invariance to scene lighting changes and hence improves the robustness of the matching operation under such variations.

Figure 5A:
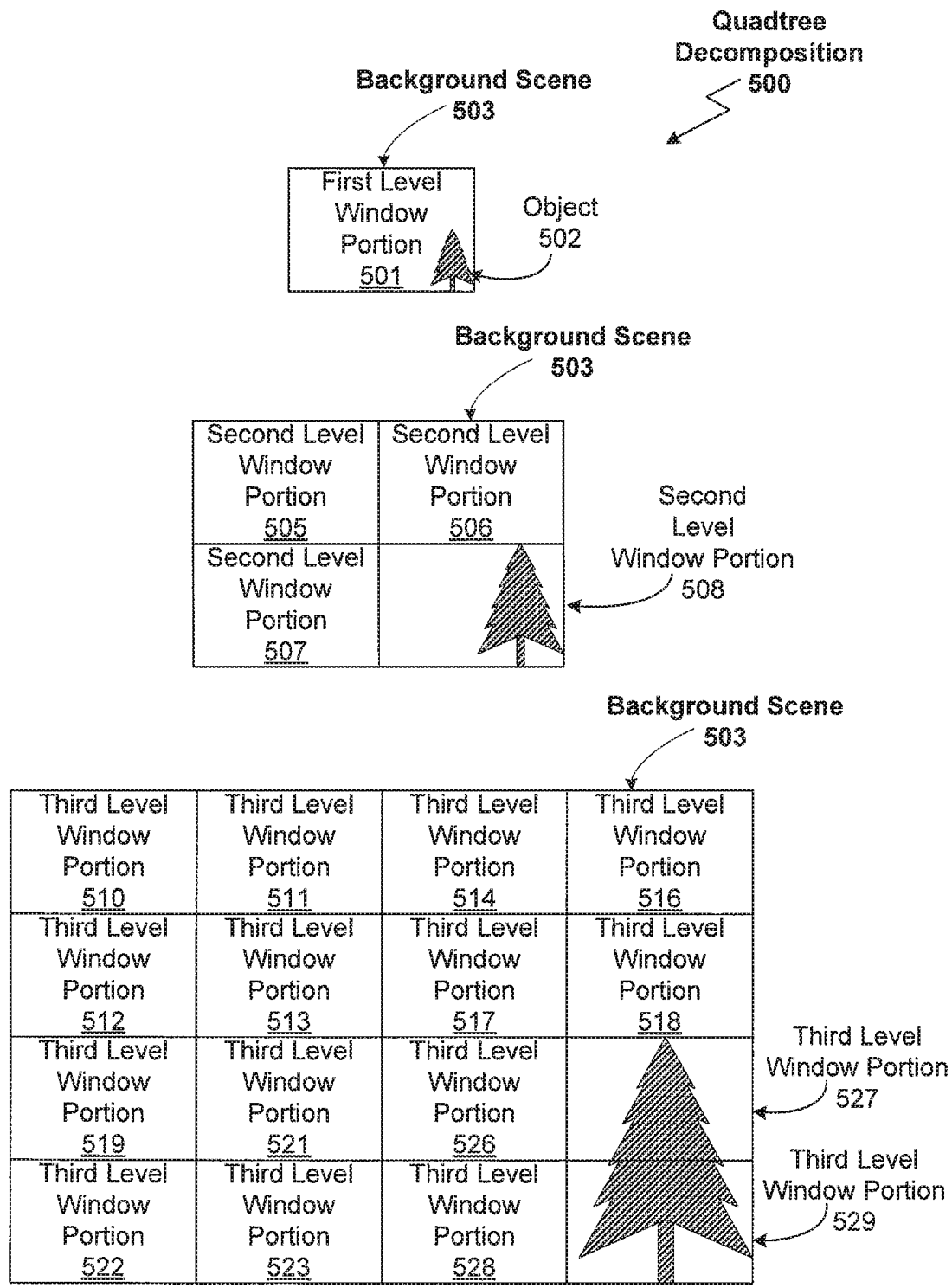
FIG. 5A illustrates a quadtree decomposition of a background scene, according to one embodiment of the disclosure.

FIG. 5A illustrates a quadtree decomposition 500 of a background scene 503, according to one embodiment of the disclosure. A quadtree decomposition analysis is used to improve the robustness of the matching operation when a portion of the scene over-saturates/under-saturates or a portion of the content changes. The background scene 503 is received and processed to generate a quadtree decomposition 500 including a plurality of window portions 501, 505, 506, 507, 508, 510, 511, 512, 513, 514, 516, 517, 518, 519, 521, 522, 523, 526, 527, 528, and 529. The quadtree decomposition 500 includes three levels with the first level window portion 501 in a first level, the second level window portions 505, 506, 507, and 508 in the second level, and the third level window portions 510, 511, 512, 513, 514, 516, 517, 518, 519, 521, 522, 526, 527, 528, and 529 in the third level. Notice that the resolution of each window portion is the same, so that the resolution of the background scene 503 increases at each level as shown by the corresponding increase in size of the object 502 in each successive level of the quadtree decomposition 500.

Each of the window portions is processed to generate a plurality of phase spectra. The phase spectra are then projected onto a corresponding plurality of scene preset image matrices of one or more scene presets. When a match between the background scene 503 and one of the scene presets is not identified a new scene preset is generated based on the background scene 503. Otherwise, the background scene 503 is incorporated into the scene preset to produce an updated scene preset.

Figure 5B:
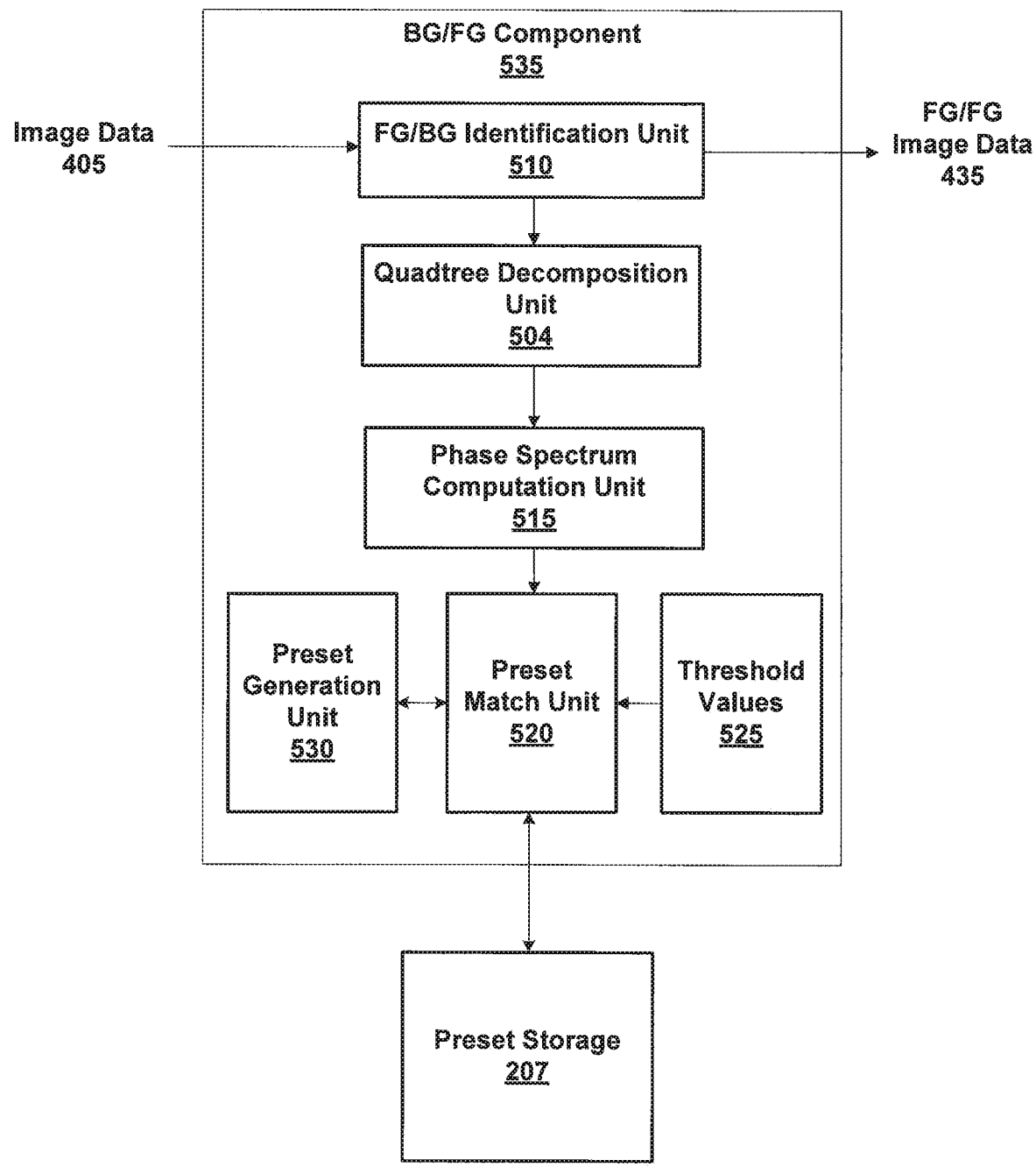
FIG. 5B illustrates components of another BG/FG component shown in FIG. 2, according to one embodiment of the present disclosure.

FIG. 5B illustrates components of another BG/FG component, BG/FG component 535 that may replace the BG/FG component 205 shown in FIG. 4A. BG/FG component 535 is configured to perform quadtree decomposition, according to one embodiment of the present disclosure. The BG/FG component 535 is coupled to the preset storage 207 and includes a FG/BG identification unit 510, a quadtree decomposition unit 504, a phase spectrum computation unit 515, a preset generation unit 530, a preset match unit 520, and threshold values 525. The FG/BG identification unit 510 extracts the foreground patch and the background scene from the image data 405 and outputs the foreground patch and the background scene as the FG/BG image data 435. The FG/BG image data 435 may also include scene preset identifier that is used by the machine-learning engine 140 to restore learning data for the scene preset.

The quadtree decomposition unit 504 is configured to generate a quadtree decomposition of the background scene that includes a plurality of window portions. In some embodiments, the quadtree decomposition unit 504 is configured to discard windows that are over-saturated due to shining bright light sources or that are under-saturated either due to dark spots in the scene or due to dark objects occluding those windows. The phase spectrum computation unit 515 receives the plurality of the window portions of the background scene (less any discarded window portions) and processes the window portions using a fast Fourier transform algorithm to generate a phase spectrum for each of the window portions of the background scene.

The phase spectra for the plurality of window portions of the background scene are output to the preset match unit 515. When a background scene is captured for the first time or when no scene presets are stored in the preset storage 207, a new scene preset is generated using the plurality of window portions of the background scene. The preset match unit 520 outputs the plurality of window portions of the background scene and pluralities of window portions for a number of additional background scenes in a sequence that includes the background scene to the preset generation unit 530. The phase spectrum computation unit 515 generates phase spectra of the plurality of window portions of the additional background scenes that are also output by preset match unit 515 to the preset generation unit 530. The preset generation unit 530 performs a principal components analysis (PCA) to produce an eigenphase decomposition (or frequency eigenspace) for the plurality of window portions of the background scene and the pluralities of window portions of the additional background scenes. The eigenphase decompositions for each window portion is encoded as image matrices with the first matrix encoding the average of the window portion of the background scene and the corresponding window portion of the additional background scenes. The subsequent matrices for each window portion encode different characteristics of the window portion of the background scene and the corresponding window portion of the additional background scenes in descending order of significance. The image matrices for the scene preset that represents the background scene and the additional background scenes are stored in the preset storage 207. In other embodiments, linear discriminant analysis or other factor analysis technique may be used to generate image matrices for matching operations.

When a background scene is received by the preset match unit 520, the preset match unit 520 determines whether one of the scene presets stored in the preset storage 207 matches the background scene. The preset match unit 520 projects the phase spectrum of each of the window portions the of background scene onto the corresponding window portions of each of the scene presets that are stored in the preset storage 207. In some embodiments, the preset match unit 520 performs the projection in parallel for all of the scene presets and in other embodiments the preset match unit 520 performs the projections serially. Based on the projection operations, the preset match unit 520 computes a reconstruction error (or a reconstruction score) for each window portion of the scene preset. The preset match unit 520 may be configured to select a subset of the reconstruction errors for the different window portions to determine whether one of the scene presets matches the background scene. If the reconstruction error for the subset of the window portions of the scene presets is less than or equal to a threshold error value then the preset match unit 520 determines that the one scene preset does represent the background scene, i.e., the scene preset matches the background scene. One or more threshold error values are stored in the threshold values 525. In some embodiments different threshold error values may be used for different cameras.

The scene preset is then updated to incorporate the matched background scene. The incorporation may be accomplished by replacing the phase spectra of each window portion of the oldest background scene that was used to compute the scene preset with the phase spectra of the window portions of the matched background scene. The preset generation unit 530 then recomputes the image matrices to produce an updated scene preset. In some embodiments the updating is performed periodically, e.g., every N minutes or images, when at least one matched background scene needs to be incorporated to update a scene preset. Consequently, over time a scene preset may evolve to reflect gradual changes of a background scene without requiring creation of a new scene preset. The phase spectra of the window portions of the background scene(s) that were used to compute each scene preset may be stored in the preset storage 207. The phase spectra of any window portions of matched background scenes that have not yet been incorporated into a scene preset may also be stored in the preset storage 207.

Figure 5C:
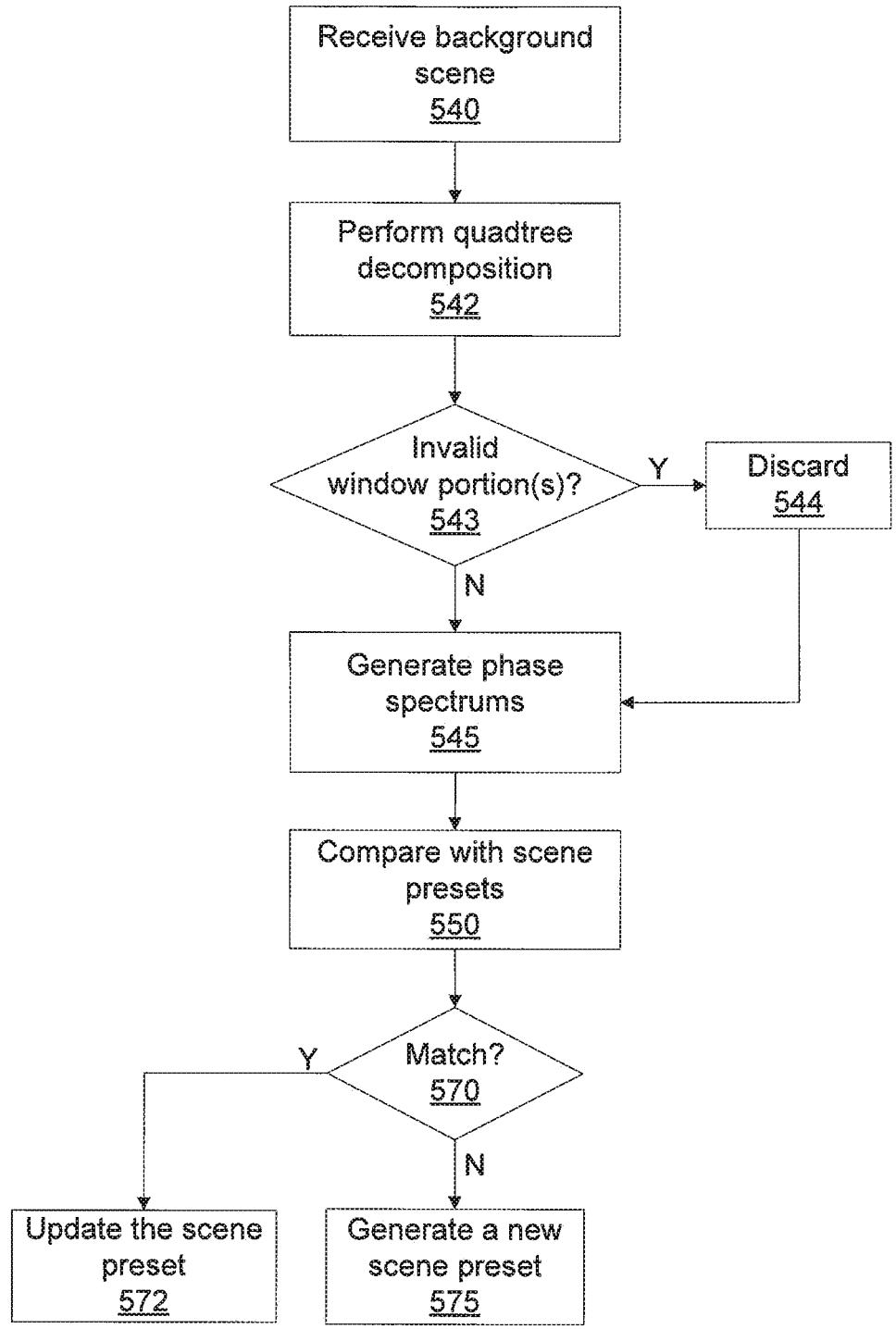
FIG. 5C illustrates a method for identifying a scene preset using quadtree decomposition analysis, according to one embodiment of the disclosure.

FIG. 5C illustrates a method for identifying a scene preset using quadtree decomposition analysis, according to one embodiment of the disclosure. As shown, the method begins at step 540 where a background scene is identified by FG/BG identification unit 510. At step 542, the quadtree decomposition unit 504 generates a quadtree decomposition of the background scene. At step 543, the quadtree decomposition unit 504 determines if any of the window portion(s) are invalid, i.e., are over-saturated or under-saturated. If, at step 543 one or more window portions are identified as invalid, then at step 544 the invalid window portions are discarded by the quadtree decomposition unit 504.

At step 545, the phase spectrum computation unit 515 generates the phase spectra for valid window portions of the background scene. At step 550, the preset match unit 520 compares the background scene with any scene presets that are stored in the preset storage 207 to determine whether the background scene matches a scene preset. Step 550 is described in detail in conjunction with FIG. 5D.

At step 570, the preset match unit 520 determines if a scene preset matches the background scene, and, if so, at step 572 the scene preset is updated to incorporate the background scene. Otherwise, at step 575 a new scene preset is generated for the background scene, as described in conjunction with FIG. 5D.

Figure 5D:
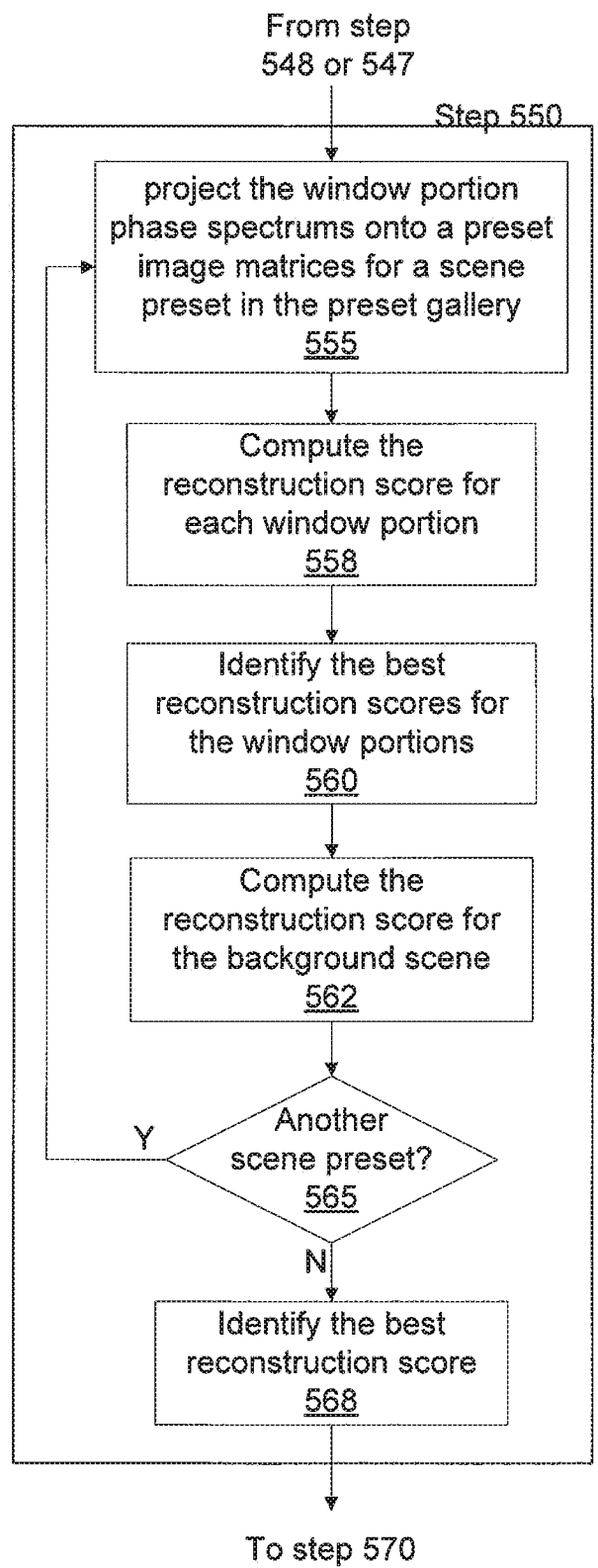
FIG. 5D illustrates a method for comparing a current background scene with scene presets using quadtree decomposition analysis, according to one embodiment of the disclosure.

FIG. 5D illustrates a method for comparing a current background scene with scene presets using quadtree decomposition analysis, according to one embodiment of the disclosure. The method begins at step 555 where the preset match unit 520 projects the phase spectra of the plurality of valid window portions of the background scene onto the corresponding image matrices for the plurality of window portions of a first scene preset in the scene preset gallery that is stored in the preset storage 207. At step 558, a reconstruction score (or reconstruction error) is computed by the preset match unit 520 for each of the valid plurality of window portions of the background scene based on the projections. At step 560, the best reconstruction scores for the plurality of window portions are identified by the preset match unit 520. In some embodiments the reconstruction score for the first level of the quadtree decomposition is identified, the best two reconstruction scores are identified for the second level of the quadtree decomposition, and the best eight reconstruction scores are identified for the third level of the quadtree decomposition. At step 562 the reconstruction score of the background scene is computed as a weighted sum of these best reconstruction scores.

In some embodiments a reconstruction score of 1.0 (or reconstruction error of 0) indicates there is a 100% match between the background scene and a corresponding scene preset. A minimum error threshold value may be specified so that a lower reconstruction score (or non-zero reconstruction error) also indicates that there is a match between the background scene and the corresponding scene preset.

At step 565, the preset match unit 520 determines if another scene preset is available for comparison with the background scene, i.e., is stored in the preset storage 207. When another scene preset is available, steps 555, 558, 560, 562, and 565 are repeated. Otherwise, at step 568 the preset match unit 520 identifies the best computed reconstruction score resulting from the comparisons between the background scene and the scene presets. The best computed reconstruction score is used in step 570 to determine whether one of any scene preset matches the background scene. In some embodiments, the preset match unit 520 is configured to skip step 550 when no scene presets are stored in preset storage 207. In other embodiments, the scene presets are initialized to predetermined values.

Advantageously, embodiments of the disclosure use a quadtree decomposition analysis is used to improve the robustness of the matching operation when the scene lighting changes or a minor portion of the content changes. When a camera position changes, a scene preset corresponding to the new position is identified and any learning that was previously generated by the machine-learning engine may be restored. This ability to continue the learning process for a previously used camera position rather than start over each time the camera position changes improves the ability of the system to quickly classify objects and behaviors and learn from previously observed patterns to identify normal and/or abnormal events.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method, comprising:
receiving a background scene;
generating a quadtree decomposition of the background scene;
determining whether a window portion of the quadtree decomposition is invalid;
discarding the window portion if the window portion is determined to be invalid;
determining whether the background scene matches a previously captured background scene, based on the quadtree decomposition;
updating the previously captured background scene when the background scene matches the previously captured background scene; and
creating a new background scene when the background scene does not match the previously captured background scene.

2. The computer-implemented method of claim 1, further comprising:
computing a phase spectrum for each window portion of the quadtree decomposition;
projecting the phase spectra onto corresponding window portions of a quadtree decomposition of the previously captured background scene; and
computing a reconstruction score for the background scene that indicates how closely the background scene matches the previously captured background scene.

3. The computer-implemented method of claim 2, wherein the computing of the reconstruction score comprises:
computing a reconstruction score for each window portion of the background scene, to produce a plurality of reconstruction scores;
selecting a subset of reconstruction scores from the plurality of reconstruction scores; and
computing the reconstruction score as a weighted sum of the reconstruction scores from the subset of reconstruction scores.

4. The computer-implemented method of claim 2, wherein the updating of the previously captured background scene comprises:
replacing phase spectra of an oldest background scene that was used to compute the previously captured background scene with the phase spectra for each window portion of the background scene; and
recomputing a quadtree decomposition of the previously captured background scene to produce the new background scene that incorporates the background scene.

5. The computer-implemented method of claim 1, wherein the background scene is determined to match the previously captured background scene based on a minimum error threshold.

6. The computer-implemented method of claim 1, wherein determining whether the window portion of the quadtree decomposition is invalid includes:
determining that the window portion is invalid if the window portion is over-saturated.

7. The computer-implemented method of claim 1, wherein determining whether the window portion of the quadtree decomposition is invalid includes:
determining that the window portion is invalid if the window portion is under-saturated.

8. The computer-implemented method of claim 1, wherein the creating of the new background scene comprises:
computing a phase spectrum for each window portion of the quadtree decomposition in a sequence of background scenes that includes the background scene; and
performing an analysis to produce image matrices that represent the background scene and the additional background scenes in the sequence.

9. The computer-implemented method of claim 1, wherein each one of the plurality of window portions of the quadtree decomposition has an equal pixel resolution.

10. A non-transitory computer-readable storage medium containing a program which, when executed by a processor, performs an operation comprising:
receiving a background scene;
generating a quadtree decomposition of the background scene;
determining whether a window portion of the quadtree decomposition is invalid;
discarding the window portion if the window portion is determined to be invalid;
determining whether the background scene matches a previously captured background scene, based on the quadtree decomposition;
updating the previously captured background scene when the background scene matches the previously captured background scene; and
creating a new background scene when the background scene does not match the previously captured background scene.

11. The non-transitory computer-readable storage medium of claim 10, further comprising:
computing a phase spectrum for each window portion of the quadtree decomposition;
projecting the phase spectra onto corresponding window portions of a quadtree decomposition of the previously captured background scene; and
computing a reconstruction score for the background scene that indicates how closely the background scene matches the previously captured background scene.

12. The non-transitory computer-readable storage medium of claim 11, wherein updating the previously captured background scene comprises:
replacing phase spectra of an oldest background scene that was used to compute the previously captured background scene with the phase spectra for each window portion of the quadtree decomposition of the background scene; and recomputing a quadtree decomposition of the previously captured background scene to produce the new background scene that incorporates the background scene.

13. The non-transitory computer-readable storage medium of claim 10, wherein determining whether the window portion of the quadtree decomposition is invalid includes:

determining that the window portion is invalid if the window portion is over-saturated.

14. The non-transitory computer-readable storage medium of claim 10, wherein the creating of the new background scene comprises:

computing a phase spectrum for each window portion of the quadtree decomposition in a sequence of background scenes that includes the background scene; and performing an analysis to produce image matrices that represent the background scene and the additional background scenes in the sequence.

15. A system, comprising:

a video input source configured to capture images;

a processor; and a memory containing a program, which, when executed on the processor is configured to perform an operation for identifying a scene preset for a background scene of an image captured by the video input source, the operation comprising:

receiving a background scene;

generating a quadtree decomposition of the background scene;

determining whether a window portion of the quadtree decomposition is invalid;

discarding the window portion if the window portion is determined to be invalid;

determining whether the background scene matches a previously captured background scene, based on the quadtree decomposition;

updating the previously captured background scene when the background scene matches the previously captured background scene; and creating a new background scene when the background scene does not match the previously captured background scene.

16. The system of claim 15, wherein the operation further comprises:

computing a phase spectrum for each window portion of quadtree decomposition;

projecting the phase spectra onto corresponding window portions of a quadtree decomposition of the previously captured background scene; and computing a reconstruction score for the background scene that indicates how closely the background scene matches the previously captured background scene.

17. The system of claim 16, wherein the computing of the reconstruction score comprises:

computing a reconstruction score for each window portion of the background scene, to produce a plurality of reconstruction scores;

selecting a subset of reconstruction scores from the plurality of reconstruction scores; and computing the reconstruction score as a weighted sum of the best reconstruction scores.

18. The system of claim 16, wherein the updating of the previously captured background scene comprises:

replacing phase spectra of an oldest background scene that was used to compute the previously captured background scene with the phase spectra for each window portion of the quadtree decomposition of the background scene; and recomputing a quadtree decomposition of the previously captured background scene to produce the new background scene that incorporates the background scene.

19. The system of claim 15, wherein the background scene is determined to match the previously captured background scene based on a minimum error threshold.

20. The system of claim 15, wherein the creating of the new background scene comprises:

computing a phase spectrum for each window portion of the quadtree decomposition in a sequence of background scenes that includes the background scene; and performing an analysis to produce image matrices that represent the background scene and the additional background scenes in the sequence.

\* \* \* \* \*